United States Patent
Sanchez-Prieto Aler

(10) Patent No.: US 8,833,242 B2
(45) Date of Patent: Sep. 16, 2014

(54) DEVICE AND METHOD FOR CONTROLLING TOASTING AND BAKING

(75) Inventor: Enrique Sanchez-Prieto Aler, Madrid (ES)

(73) Assignee: Crambo, S.A., Madrid (ES)

( * ) Notice: Subject to any disclaimer, the term of this patent is extended or adjusted under 35 U.S.C. 154(b) by 193 days.

(21) Appl. No.: 12/866,157

(22) PCT Filed: Feb. 4, 2009

(86) PCT No.: PCT/ES2009/000059
§ 371 (c)(1),
(2), (4) Date: Oct. 13, 2010

(87) PCT Pub. No.: WO2009/098334
PCT Pub. Date: Aug. 13, 2009

(65) Prior Publication Data
US 2011/0017075 A1    Jan. 27, 2011

(30) Foreign Application Priority Data
Feb. 4, 2008    (ES) .................................. 200800290

(51) Int. Cl.
*A47J 27/62*    (2006.01)
*A47J 37/06*    (2006.01)
*A47J 37/08*    (2006.01)

(52) U.S. Cl.
CPC ..................................... *A47J 37/085* (2013.01)
USPC ............................................................. 99/331

(58) Field of Classification Search
CPC .............................. A47J 37/08; A47J 37/085
USPC .................. 99/331, 332, 333, 334, 335, 388, 99/389–392, 329 P, 329 RT; 426/466
See application file for complete search history.

(56) References Cited

U.S. PATENT DOCUMENTS 6,730,888 B1 *    5/2004    Battu ............................. 219/502
2004/0206248 A1 *    10/2004    Lawson .......................... 99/388

* cited by examiner

*Primary Examiner* — Dana Ross
*Assistant Examiner* — Lindsey C Teaters
(74) *Attorney, Agent, or Firm* — Arent Fox LLP

(57) ABSTRACT

Device for controlling toasting and baking having means for sensing toasting, such that the degree of toasting is detected as a function of the shade thereof, means for processing the signal emanating from the sensing means, logic processing and control means, logic storage means, and a plurality of toasting means, wherein all the components are connected to the logic processing and control means, thereby enabling a method for controlling toasting or baking, based on the change in shade of the product to be toasted or baked, to be implemented.

4 Claims, 1 Drawing Sheet

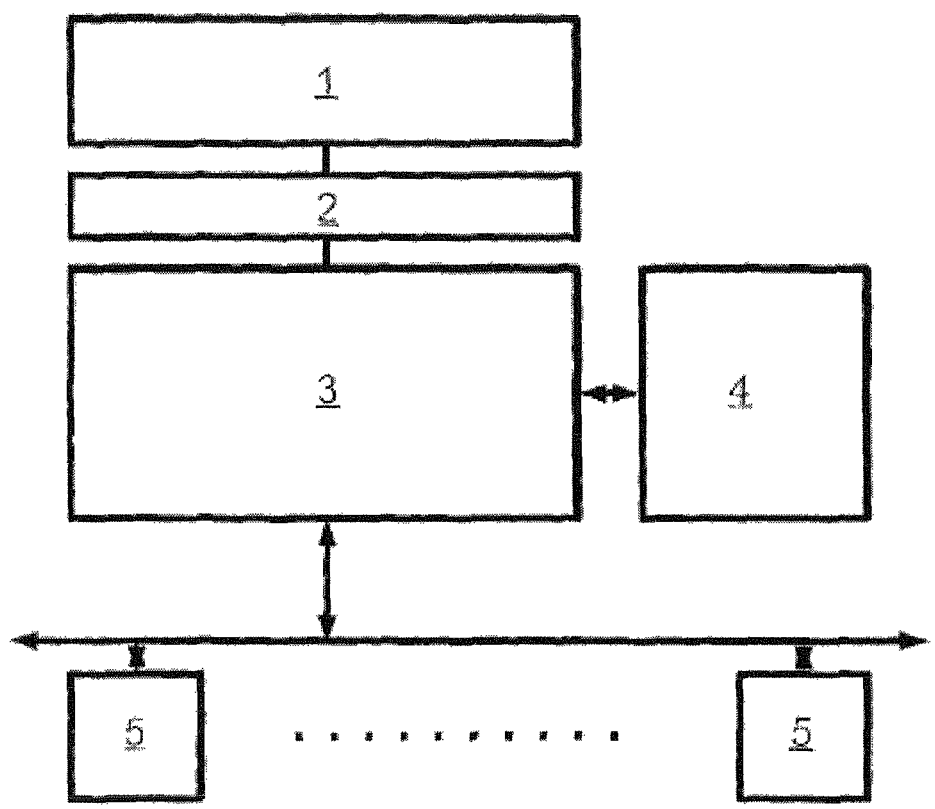

DEVICE AND METHOD FOR CONTROLLING TOASTING AND BAKING

CROSS-REFERENCE TO RELATED APPLICATION

This application is a National Stage entry of International Application No. PCT/ES2009/000059, filed Feb. 4, 2009, which claims priority to Spain Patent Application P200800290, filed Feb. 4, 2008, the disclosure of the prior application is incorporated in its entirety by reference.

The purpose of the toasting and baking control device is to sense the degree of toasting or baking for a product as well as its homogeneity so that an optimum result may be obtained. It may be used in any item that is used for toasting or baking food as well as other products, for example, pottery.

INVENTION BACKGROUND

In the current state of the art, there is no way of controlling that the baked product always obtains the same degree of toasting. Almost all systems are based on toasting for a determined period of time and at a determined temperature; but the product to be toasted is often different or is subjected to different conditions. The toasting time varies in accordance with the type of product to be toasted or baked. This means that the intensity of the heat and the time that is to be applied is always different. The truth is that in many occasions, the product is burnt or is not sufficiently toasted. The present invention intends to eliminate the need for the user to have to calculate these values each time.

Another problem is achieving a toasting that is uniform. Normally, the non-uniformity occurs due to the proximity of the product to the heat source, which is not always the same, as well as the material of the product to be toasted, which is also not always the same.

DESCRIPTION OF THE INVENTION

The device for controlling toasting and baking, purpose of this invention patent comprises at least the following:
(i) means for sensing toasting, such that the degree for toasting is detected as a function of the shade thereof;
(ii) means for processing the signal emanating from the sensing means;
(iii) logic processing and control means;
(iv) logic storage means; and
(v) a plurality of toasting means.

Wherein all the components are connected to the logic processing and control means. The toasting means can have any shape but the smaller they are, the uniformity of the toasting control will be more accurate. Also, this system has another advantage, which is the energy savings since only those required are turned on. In other words, not only are the toasting means covering the excessively toasted areas turned off, but those covering areas that have nothing to toast are also not turned on.

This device includes a toasting and baking control method, which includes the following stages:
(i) once the system has initialized, the toasting means begin to operate;
(ii) once the toasting means have reached their working temperature, an initial impression of the product to be toasted or baked is sensed;
(iii) every n seconds, the sensing means sense the condition the item is in, where the value of n depends on the type of product and compares it to the original impression of the prior stage, and the toasting is identified by the change in shade thereof;
(iv) during the comparison with the prior stage, if there is an area that changes in colour quicker than another; in other words, it gets toasted faster, the processor can turn off or reduce the power of the toasting means that are covering the greater toasted areas;
(v) the detection of sufficient toasting is provided by at least one sub-process selected from the following:
   detection by comparison with captures that are preloaded with the proper degree so that the logic processor can compare it with the colour that the product is acquiring;
   detection by comparison with stored sensing by the user with the optimum degree of toasting for that particular use;
   detection by comparison with an impression that is darkened or lightened by the user with the proper means;
   detection by the level of darkening, where the system compares the initial colour with the change in colour that is produced during the taking of successive captures; or
(vi) once the degree of toasting or baking is reached, as well as the optimum uniformity, the system will stop the toasting or baking.

Thanks to this system and method, we can achieve a final uniform product with a degree of toasting that is chosen by the user, regardless of the initial product or its shape and condition.

BRIEF DESCRIPTION OF THE FIGURES

Below is a brief description of a series of drawings that help to better understand this invention, which are precisely related to the embodiment of this invention, providing an illustrated example that is not intended to limit this invention.

FIG. 1 shows a schematic view of the system purpose of this patent invention.

PREFERRED EMBODIMENT OF THE INVENTION

In a preferred embodiment of this invention, the device for controlling toasting and baking, purpose of this invention patent, comprises at least the following:
(i) means for sensing toasting (1), such that the degree for toasting is detected as a function of the shade thereof;
(ii) means for processing the signal (2) emanating from the sensing means (1)
(iii) logic processing and control means (3)
(iv) logic means for storing (4);
(v) a plurality of toasting means (5);
   wherein all the components are connected to the logic processing and control means (3).

A second aspect of this invention is the toasting and baking control method, which comprises at least the following stages:
(i) once the system has initialized, the toasting means (5) begin to operate;
(ii) once the toasting means have reached their working temperature, an initial impression of the product to be toasted or baked is captured by the toasting sensing means (1);
(iii) every n seconds, the sensing (1) means capture the condition the item is in, where the value of n depends on the type of product and compares it to the original impression of the prior stage, and the toasting is identified by the change in shade thereof;

(iv) during the comparison with the prior stage, if there is an area that changes in colour quicker than another; in other words, it gets toasted faster, the logical processing and control means (3) of the toasting (5) means that cover the greater toasted areas are turned off or their power is reduced;

(v) the detection of sufficient toasting is provided by at least one sub-process selected from the following:

- detection by comparison with captures that are pre-loaded with the proper setting so that the logic processor (3) can compare it with the colour that the product is acquiring;
- detection by comparison with stored sensing by the user with the optimum degree of toasting for that particular use;
- detection by comparison with an impression that is darkened or lightened by the user with the proper means;
- detection by the level of darkening, where the system compares the initial colour with the change in colour that is produced during the taking of successive captures; or (vi) once the degree of toasting or baking is reached, as well as the optimum uniformity, the system will stop the toasting or baking.

The invention claimed is:

1. Method for controlling toasting and baking in a system comprising the following steps:

once the system has been initialized, a toasting apparatus begins to operate;

once the toasting apparatus has reached a working temperature, capturing an initial impression of a product to be toasted or baked;

sensing a condition of the product to be toasted or baked every "n" seconds:

wherein toasting is identified by a change in shade or coloring of the product when a processor compares:

the condition of the product with an impression of the product stored in a memory device with a degree of toasting or baking chosen by the user; and levels of darkening of the product in successive captures;

wherein during said comparison the processor reduces power to one or more portions of the toasting apparatus that cover areas of a surface of the product which have changed color faster than other areas of the surface; and turning off the toasting apparatus when the degree of toasting or baking chosen by the user is reached as well as the toasting or baking is uniform on the surface of the product.

2. The method of claim 1 wherein the impression of the product stored in the memory device is pre-loaded with a degree of toasting chosen by the user.

3. The method of claim 1 wherein the impression of the product stored in the memory device is darkened or lightened by the user before the toasting apparatus begins to operate.

4. The method of claim 1 wherein the processor determines a degree of darkening by comparing an initial color with a change in color that is produced during the taking of successive captures of the product every "n" seconds.

* * * * *